Patented Dec. 6, 1932

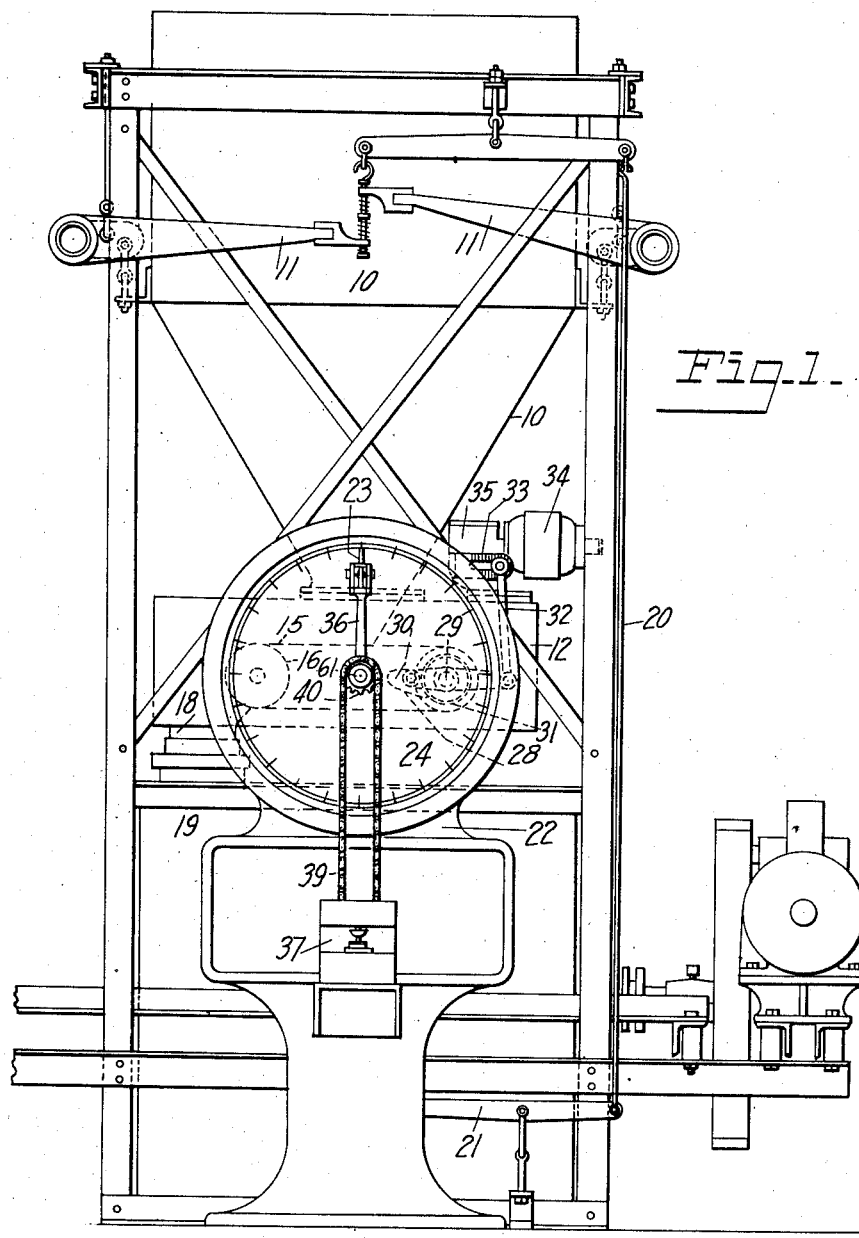

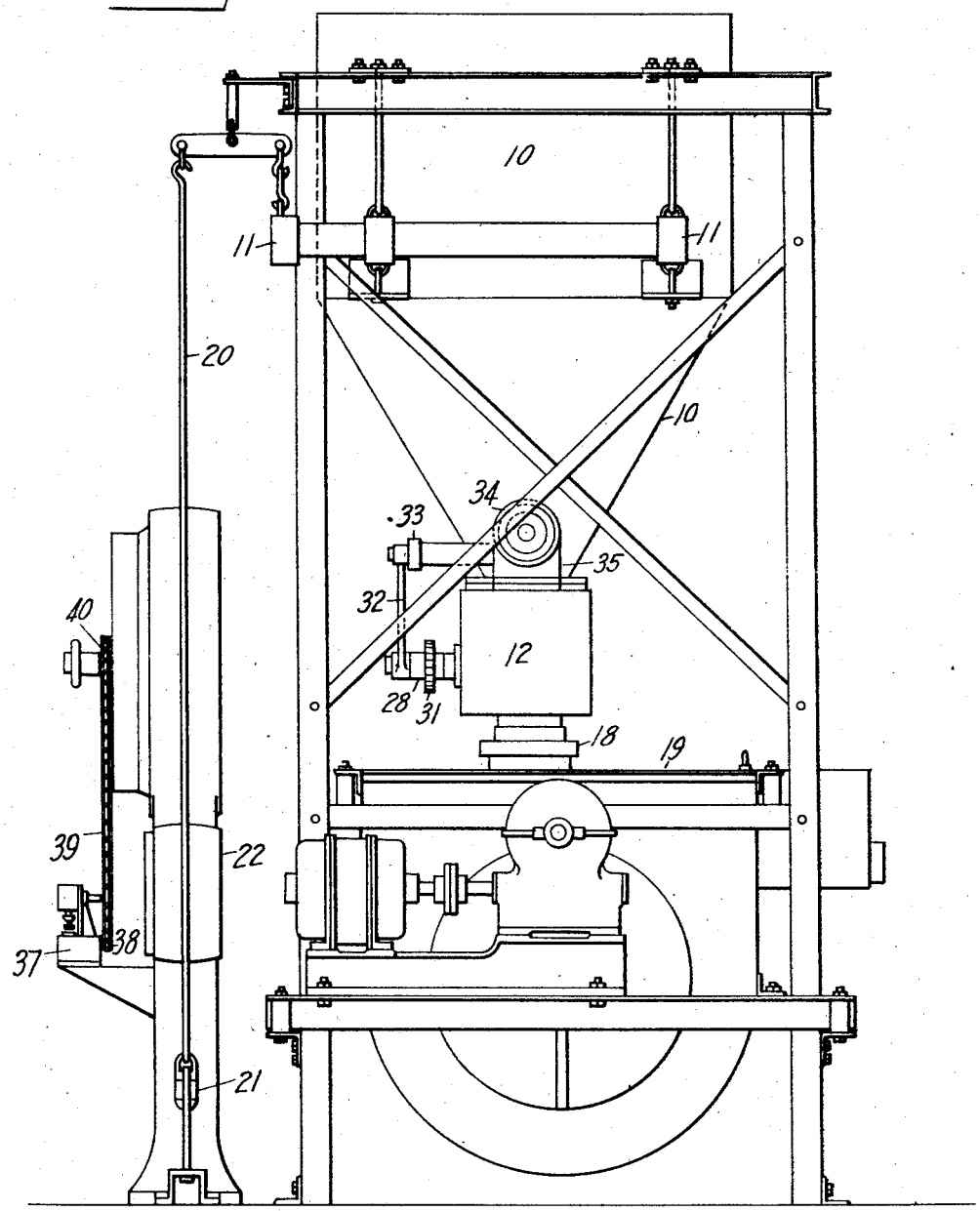

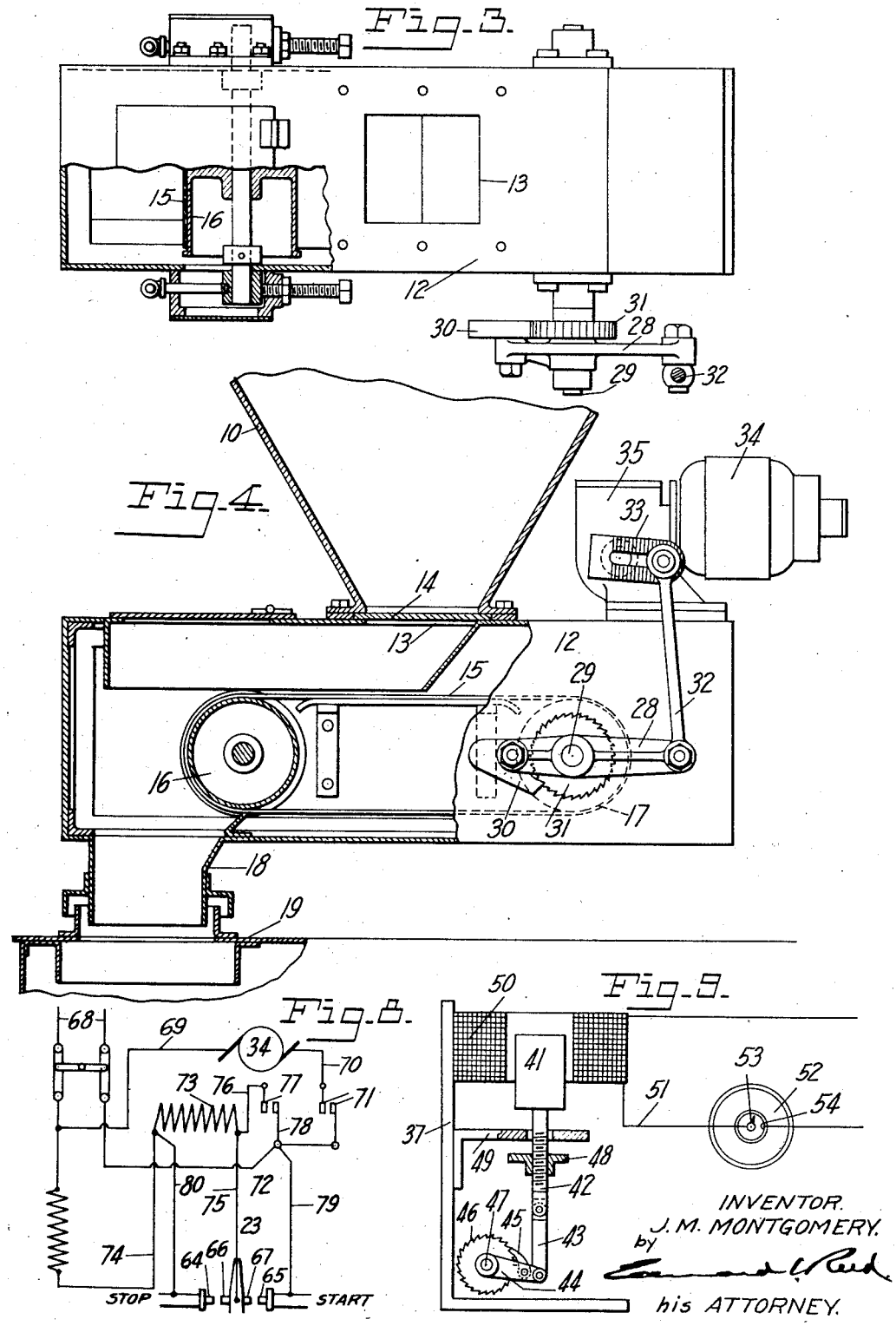

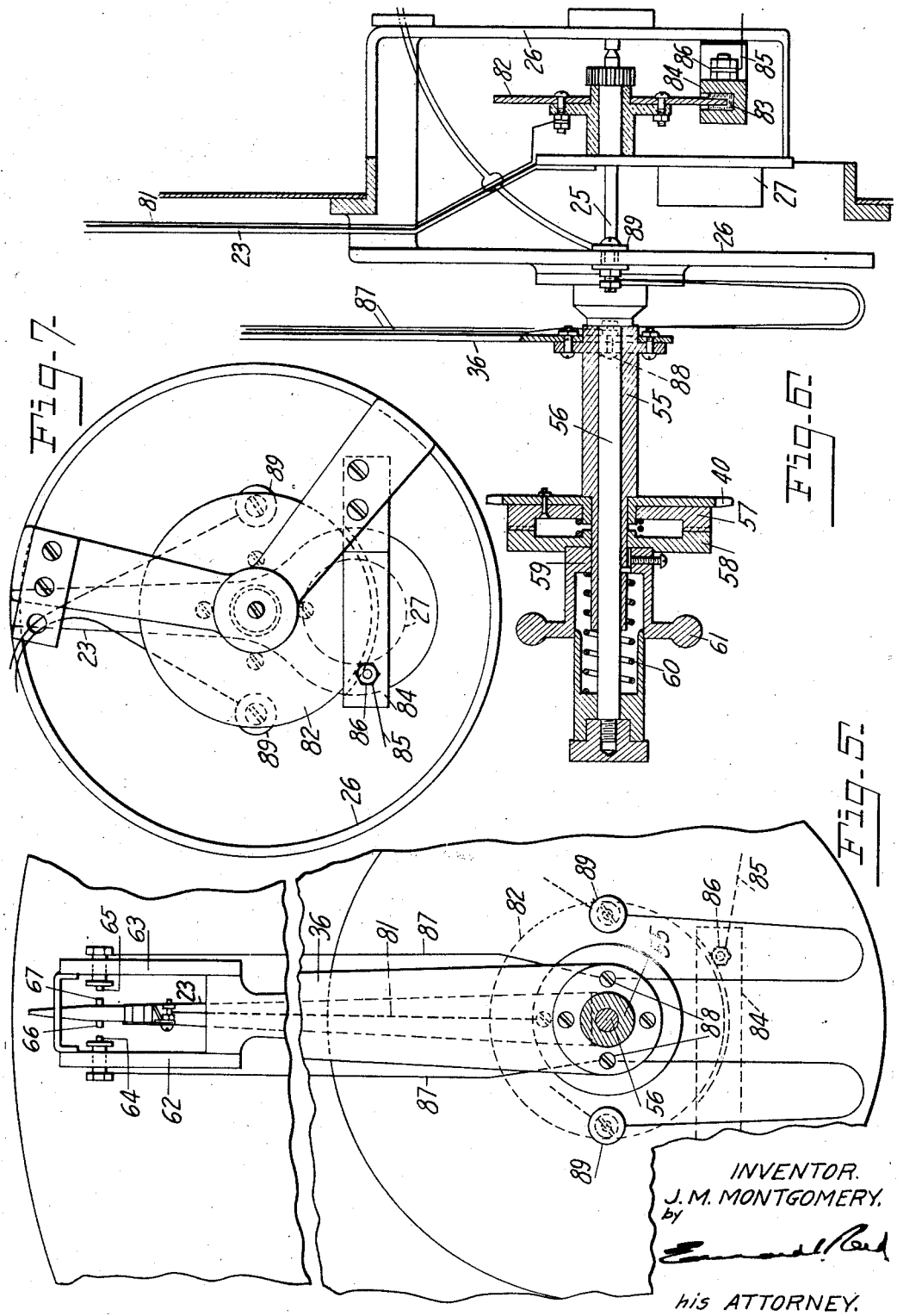

1,890,160

UNITED STATES PATENT OFFICE

JAMES M. MONTGOMERY, OF PIQUA, OHIO

AUTOMATIC MEASURING MECHANISM

Application filed October 13, 1930. Serial No. 488,317.

This invention relates to an automatic measuring mechanism.

One object of the present invention is to provide a mechanism which will deliver material in varying quantities determined by conditions which exist independently of the measuring mechanism.

A further object of the invention is to provide such a mechanism in which the material to be delivered is supported by weighing mechanism and in which the delivery of the material is controlled by the combined operations of the weighing mechanism and of a controlling device operated independently of the weighing mechanism.

A further object of the invention is to provide a mechanism which will be simple in construction and operation and which will be accurate in its operation.

Other objects of the invention will appear as the apparatus is described in detail.

In the accompanying drawings Fig. 1 is a front elevation of a measuring mechanism embodying my invention; Fig. 2 is a side elevation of the same; Fig. 3 is a plan view, partly broken away, of the housing for the conveyor which controls the delivery of material from the container; Fig. 4 is a side elevation of the housing, partly broken away; Fig. 5 is an elevation, partly broken away, of the two movable controlling members; Fig 6 is a sectional view of the supporting mechanism for the controlling members; Fig. 7 is an elevation of the frame on which the controlling members are supported; Fig. 8 is a diagram of the controlling circuit for the magnetic switch; and Fig. 9 is a sectional detail view of the proportioning device.

In these drawings I have illustrated one embodiment of my invention but it will be understood that this embodiment has been chosen for the purpose of illustration only and that the apparatus may take various forms without departing from the spirit of the invention.

In its preferred form the mechanism comprises a material delivering device having a motor operated part to control the delivery of material thereby and the operation of this part by the motor is controlled by the relative movements of two members one of which is actuated in accordance with the quantity of material delivered by the delivering device and the other of which is actuated by means independent of the delivery device, and in accordance with which the delivery of the material is to be regulated.

In that particular form of the apparatus here illustrated the material delivering device comprises a container 10 which forms part of a weighing mechanism and which is supported by the weigh arms 11 of the weighing mechanism. The weighing mechanism as a whole forms no part of the present invention and inasmuch as it may be of any suitable character it need not be here illustrated or described in detail. The delivery of the material from the container may be controlled in various ways but I prefer to employ a power operated conveyor which will move the material from the container to the point of delivery and the operation of which may be controlled to regulate the quantity of material delivered from the container. As here shown, a housing 12 is rigidly secured to and supported by the lower end of the container 10 and has in its top wall an opening 13 through which material may be delivered from the container into the housing. If desired, this opening may be provided with a manually operated cut-off 14, which will be moved to its open position when the apparatus is in operation. A conveyor is mounted within the housing below the opening 13 so that it will receive the material which is discharged from the container and, as here shown, the conveyor is in the form of an endless belt 15 supported by drums 16 and 17, the latter of which constitutes the driving element for the conveyor. As the upper stretch of the endless belt is advanced the material thereon will be discharged over the drum 16 to a conduit or chute 18 which leads to a suitable point of delivery, preferably to a reservoir within which the material is to be mixed with other substances, a portion of such a reservoir being shown at 19. The weigh arms 11 upon which the container is supported are connected by a rod 20 and lever 21 with a weight indicating mechanism which is arranged within a hollow standard or casing 22 and comprises a movable member or pointer 23, which may, if desired, move over a dial 24 to indicate the weight of the material within the container. This movable member or pointer 23 is mounted on a shaft 25 journaled in fixed bearings in a frame 26 and is here shown at 27 as counter-weighted. When the material is deposited in the container 10 the movable member or arm 23 will be moved in a clockwise direction to indicate the weight of the material. As the delivery mechanism is operated to discharge the material from the container the decreasing weight of the material within the container will cause the pointer 23 to move in a counter-clockwise direction. The movable member or pointer 23 constitutes a part of the device for controlling the operation of the conveyor by the motor.

The power operated mechanism for actuating the conveyor may take various forms and, in the present arrangement, a lever 28 is pivotally mounted for movement about the axis of the conveyor drum 17, as shown at 29, and has mounted on one end thereof, a pawl 30 which engages a ratchet wheel 31 rigidly connected with the conveyor drum. The other end of the lever 28 is connected by a pitman 32 with a crank arm 33 which is driven by a motor 34. The crank arm 33 is connected with the motor shaft through suitable reducing gearing which is not here shown but is mounted within a housing 35. It will be apparent that each rotation of the crank arm 33 will cause one complete oscillation to be imparted to the lever 28, thereby causing the pawl to advance the ratchet wheel, and consequently the conveyor, a predetermined distance for each rotation of the crank arm. Preferably the motor is mounted on the conveyor housing so that it will move therewith as the latter rises and falls in accordance with the variations in the weight of the material in the container and will thereby be maintained at all times in fixed relation to the conveyor actuating lever 28. The operation of the conveyor, or other operable part of the delivering device, by the motor may be controlled in various ways but, in the present instance, this is accomplished through the operation of a switch to start and stop the motor and the opening and closing of the switch is controlled by the movable member or pointer 23 in cooperation with a second movable member, which is actuated either at a predetermined speed or in accordance with the delivery of some other substance with which the material delivered by the delivering device is to be mixed, such as water. This second movable member is here shown in the form of an arm 36 which is mounted for movement about an axis coincident with the axis of the movable member or pointer 23 and is driven by a proportioning device of a well known type, which is shown as a whole at 37 and which comprises a sprocket 38 connected by a chain 39 with a sprocket wheel 40 which has driving connection with the movable member or arm 36. The form of the proportioning device here employed is shown in Fig. 9 and comprises a solenoid, the core 41 of which is connected by a rod 42 and link 43 with a pivoted arm 44 which carries a pawl 45 which engages a ratchet wheel 46 rigidly secured to a shaft 47 to which the sprocket wheel 38 is secured. The movement imparted to the pawl by the solenoid is controlled by a stop 48 adjustably mounted on the rod 42 and adapted to engage a bracket 49 through which the rod extends. The coil 50 of the solenoid is connected by a circuit 51 with a suitable source of electrical energy and this circuit may be automatically controlled by a meter or like device, as shown at 52. One side of the circuit is there shown as connected with a contact member 53 connected with the meter shaft and the other side of the circuit is connected with a fixed contact member 54 arranged to be engaged by the contact member 53 once upon each complete rotation of the meter shaft, thereby causing the solenoid to be energized and a predetermined movement imparted to the ratchet wheel 46 and the movable arm 36.

In order that the movable arm 36 may be adjusted with relation to the pointer 23, at the beginning of the operation, I have shown the arm 36 as rigidly secured to a sleeve 55 rotatably mounted upon a shaft 56 which is rigidly secured to the supporting frame 26. The sprocket wheel 40 is rotatably mounted on this sleeve and has on its outer face a clutch member 57 with which cooperates a second clutch member 58 having rigidly connected thereto a hub portion 59 which is slidably mounted on the sleeve and is held against rotation with relation thereto. A spring 60 acts on the hub member 59 to hold the clutch member 58 normally in engagement with the clutch member 57, thus causing the sleeve to be rotated by the sprocket wheel. The hub member has a hand wheel 61 by means of which it may be moved against the action of the spring 60 to disconnect the two clutch members and thus permit the sleeve to be rotated independently of the sprocket wheel for the purpose of adjusting the arm 36 with relation to the pointer as will be hereinafter explained.

The operation of the delivering device by the motor is controlled by the relative movements of the two movable members 23 and 36 and this control may be exercised in any suitable manner. When, as in the present instance, the operation of the delivering mechanism by the motor is controlled by an electrically operated device, the two movable members will be provided with circuit breakers and closers of such a character and so arranged that when the two members are in certain relative positions the motor will be caused to operate the delivery mechanism and when said movable members are in certain other relative positions the operation of the delivery device by the motor will be discontinued. Both the pointer 23 and the arm 36 rotate in the same direction, that is, in counter-clockwise direction. Ordinarily the weight actuated pointer 23 will move at a slightly greater speed than the controlling arm 36. When the weight actuated pointer overtakes the controlling arm, or moves into a certain predetermined position with relation therewith, the delivery of material is interrupted and the weight actuated arm remains stationary while the controlling arm 36 moves with relation thereto until it has assumed another position with relation thereto which will result in the delivering mechanism being again operated to deliver material. In the particular arrangement here shown the controlling arm 36 is bifurcated at its outer end and the two arms of the bifurcation, 62 and 63, carry contact members 64 and 65 which are connected with an electrically operated device which will be hereinafter described. The weight actuated pointer 23 is provided on its opposite sides with contact members 66 and 67. The contact members 64 and 65 are spaced apart such a distance that when the two movable members are in their normal or idle positions the contacts 66 and 67 may be spaced from the corresponding contacts 64 and 65. When the pointer moves ahead of the arm 36 the contact 66 will engage the contact 64 and close one circuit of the electrically operated device. When the controlling arm 36 moves ahead of or overtakes the weight actuated pointer 23 the contact 67 will engage the contact 65 and close another circuit through the electrically operated device. The opening and closing of these circuits of the electrically operated device serve, in the present instance, to open and close the switch in the motor circuit.

The controlling device for the motor switch may take various forms and does not in itself form any part of the invention. As shown in the circuit diagram of Fig. 8 the motor 34 is connected with the power line 68 by a circuit including a conductor 69, conductor 70, switch 71 and conductor 72. The switch 71 is magnetically operated and the movable member thereof is therefore operatively connected with an electro-magnet 73. This magnet is connected at one end with the power line by means of a conductor 74 and the other end of the magnet is connected by a conductor 75 with the two contact members 66 and 67 on the movable member or pointer 23. This same end of the magnet is connected with the conductor 72, leading to the power line, by a branch circuit consisting of a conductor 76, switch 77 and conductor 78. The switch 77 is operatively connected with the magnet and will be closed when the motor switch 71 is closed. The contact member 65 on the controlling arm 36 is connected by a conductor 79 with the conductors 72 and 78. The contact member 64 on the controlling arm 36 is connected by a conductor 80 with that end of the magnet with which the conductor 73 is connected. In the diagram the movable pointer 23 is in an intermediate position with relation to the two parts of the controlling arm 36 and all circuits are open. With the parts in this position the motor will be idle and as the proportioning device advances the controlling arm 36 the contact 65 will be brought into engagement with the contact 67, thereby closing the circuit through the magnet as follows: through the conductor 74, magnet 73, conductor 75, contacts 67-65, conductor 79 and conductor 72. The magnet is thus energized and the motor switch 71 and the switch 77 in the branch magnet circuit are both closed. The closing of the switch 77 completes the circuit through the magnet independently of the contacts 67 and 65, thus permitting the weight actuated pointer to move with relation to the controlling arm without deenergizing the magnet and thereby opening the motor circuit. The motor will continue to operate until the weight actuated arm 23 is advanced far enough to cause the contact 66 to engage the contact 64, thereby closing the circuit from the power line through the conductor 74, conductor 80, contacts 64 and 66, conductor 75, conductor 76, switch 77, conductor 78 and conductor 72. The closing of this circuit shunts the current about the magnet, because the current will follow the line of least resistance, thereby deenergizing the magnet and permitting both the motor switch 71 and the switch 77 to open. It will be noted that the opening of both switches takes place immediately upon the closing of this shunt circuit irrespective of the length of time that the contacts 64 and 66 may remain in engagement. The weight actuated arm is now stationary and the circuits remain open until the controlling arm 36 is advanced by the proportioning device a distance sufficient to again bring the contact 65 into engagement with the contact 67 and the cycle of operations above described is repeated.

The circuit breakers and closers which are carried by the movable members 23 and 36 may be connected with the power line and with the motor controlling device in any suitable manner. As here shown, a flexible cord 81 extends from the contacts 66 and 67 inwardly along the pointer 23 and is connected at its inner end with a disk 82 of conducting material which is mounted on but insulated from the shaft 25 which carries the arm 23. The lower portion of this disk 82 projects into a body of mercury 83 contained in a receptacle 84 which is mounted on and insulated from the frame 26, and a flexible cord 85 leads from a terminal 86 in the mercury receptacle to the point of connection with the motor controlling device. Flexible cords 87 lead from the contact members 64 and 65 inwardly along the controlling arm 36 to binding posts 88 adjacent to the axis of the arm, and are then carried to binding posts 89 on the fixed frame 26, from which they extend to their points of connection with the motor controlling device. Sufficient slack is provided in the cords between the contacts 88 and 89 to permit of the free movement of the controlling arm about its axis.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a mechanism of the character described, a material delivering device, operable means for causing the delivery of material by said device, a movable member, means for actuating said movable member in accordance with the quantity of material delivered by said device, a second member movable with relation to the first mentioned movable member, separate means for actuating said second movable member, and means controlled jointly by said members for controlling the operation of the means which controls the delivery of material by said delivery device.

2. In a mechanism of the character described, a material delivering device, electrically operated means for causing the delivery of material by said device, a movable member, means for actuating said movable member in accordance with the quantity of material delivered by said device, a second member movable with relation to the first mentioned movable member, separate means for actuating said second movable member, and means controlled jointly by said members for making and breaking the circuit through said electrically operated means.

3. In a mechanism of the character described, a material delivering device, operable means for causing the delivery of material by said device, two members movable in the same direction, each member being movable with relation to the other member, means for actuating one of said members in accordance with the quantity of material delivered by said device, means for actuating the second member independently of the first mentioned member, means controlled by the movement of said second member to a predetermined position with relation to the first mentioned member to cause said delivery controlling means to initiate the delivery of material by said delivering device and controlled by the movement of the first mentioned member to a predetermined position with relation to the second member to cause said delivery controlling means to interrupt the delivery of material by said delivering device.

4. In a mechanism of the character described, a material delivering device, electrically operated means for causing the delivery of material by said device, a movable member, means for actuating said movable member in accordance with the quantity of material delivered by said device, a second member movable with relation to the first mentioned movable member, separate means for actuating said second movable member, and circuit controlling means carried by said movable members and so arranged that the movement of said members to predetermined relative positions will cause the circuit to be closed through said electrically operated means and the movement of said members to other predetermined relative positions will cause said circuit to be opened.

5. In a mechanism of the character described, a material delivering device comprising a movable part, a motor to operate said movable part, an electrically operated device to control the operation of said delivering device by said motor, a movable member, means for actuating said movable member in accordance with the quantity of material delivered by said delivering device, a second member movable with relation to the first mentioned movable member, separate means for actuating said second movable member, and circuit controlling means connected with said electrically operated device and including parts carried by said movable members and controlled by the relative positions of said movable members.

6. In a mechanism of the character described, a material delivering device comprising a movable part, a motor to operate said movable part, an electrically operated device to control the operation of said part of said delivering device by said motor and comprising two circuits, a movable member, means for actuating said movable member in accordance with the quantity of material delivered by said delivering device, a second member movable with relation to the first mentioned movable member, separate means for actuating said second movable member, and circuit making and breaking devices connected in the respective circuits and controlled by the relative positions of said movable members to alternately close said circuits.

7. In a mechanism of the character described, a material delivering device comprising a movable part, a motor to operate said movable part, an electrically operated device to control the operation of said part of said delivering device by said motor and comprising two circuits, a movable member, means for actuating said movable member in accordance with the quantity of material delivered by said delivering device, a second member movable with relation to the first mentioned movable member, separate means for actuating said second movable member, and two circuit breakers and closers connected with the respective circuits, carried by said movable members and so arranged that when said movable members are in certain predetermined relative positions one of said circuits will be closed and when said movable members are in other predetermined relative positions the other of said circuits will be closed and the first mentioned circuit open.

8. In a mechanism of the character described, a material delivering device comprising a movable part, a motor to operate said movable part, an electrically operated device to control the operation of said part of said delivering device by said motor and comprising two circuits, a movable member, means for actuating said movable member in accordance with the quantity of material delivered by said delivering device, a second member movable with relation to the first mentioned movable member, separate means for actuating said second movable member, contact members connected with the respective circuits and carried by one of said movable members, and other contact members connected with said circuits, carried by the other movable member and arranged to be moved into and out of engagement with the respective first mentioned contact members by the relative movements of said movable members.

9. In a mechanism of the character described, a material delivering device, electrically operated means for causing the delivery of material by said delivering device and having two circuits, a movable member, contact members carried by said movable member and connected with said circuits, means for actuating said movable member in accordance with the quantity of material delivered by said delivering device, a second member movable in the same direction as the first mentioned movable member and with relation thereto, contact members carried by said second movable member, arranged on opposite sides of the contact members carried by the first mentioned movable member and connected with the respective circuits, and separate means for actuating said second movable member.

10. In a mechanism of the character described, a material delivering device, a motor to cause the delivery of material by said delivering device, two members movable in the same direction with relation one to the other, means for actuating one of said movable members in accordance with the quantity of material delivered by said delivering device, other means for actuating the other movable member, a switch to control the operation of said motor, a magnet to close said switch, a circuit for said magnet, a second circuit shunted about said magnet to short circuit the same, means controlled by said movable members for closing said magnet circuit when said movable members are moved to predetermined relative positions and for closing said shunt circuit when said movable members are moved to other predetermined relative positions, a branch circuit for said magnet, and a switch in said branch circuit adapted to be actuated by said magnet and to maintain a closed circuit through said magnet when said movable members are in intermediate positions.

11. In a mechanism of the character described, a container, an operative device for causing the discharge of material from said container, electrically operated means to control the operation of said device, a movable member, means controlled by the weight of material in said container for actuating said movable member, a second member movable with relation to the first mentioned member, separate means for actuating said second member, and means controlled by the relative positions of said movable members to control the operation of said electrically operated device.

12. In a mechanism of the character described, a container, an operative device for causing the discharge of material from said container, electrically operated means to control the operation of said device, two members movable with relation one to the other about a common axis, and means controlled by the relative positions thereof to control the circuit through said electrically operated means, means for actuating one of said members in accordance with the quantity of material discharged from said container, and separate means for actuating the other member.

13. In an apparatus of the character described, weighing mechanism, a container supported by said weighing mechanism, an operable device to cause the discharge of material from said container, a movable member, means separate from said weighing mechanism to actuate said movable member, said weighing mechanism having a part movable with relation to said movable member, and means controlled by the relative movements of said movable member and said part of said weighing mechanism to control the operation of said operable device.

14. In an apparatus of the character described, weighing mechanism, a container supported by said weighing mechanism, an operable device to cause the discharge of material from said container, electrically operated means to control the operation of said device, a controlling device, and separate means for actuating said controlling device, said weighing mechanism having a part cooperating with said controlling device to control the circuit through said electrically operated means and thereby control the discharge of material from said container.

15. In an apparatus of the character described, weighing mechanism, a container supported by said weighing mechanism, an operable device to cause the discharge of material from said container, electrically operated means to control the operation of said device, a circuit breaker and closer in the circuit for said electrically operated means, said weighing mechanism having a movable part the position of which is controlled by the weight of material in said container, a part movable with relation to said movable part of said weighing mechanism and cooperating therewith to control the operation of said circuit breaker and closer, and separate means for actuating the last mentioned part.

16. In an apparatus of the character described, weighing mechanism, a container supported by said weighing mechanism, an operable device to cause the discharge of material from said container, electrically operated means to control the operation of said device, said weighing mechanism having a rotatable member the position of which is controlled by the weight of material in said container, a controlling member movable about the axis of the first mentioned member and arranged normally in advance thereof, said members having cooperating parts to control the circuit through said electrically operated means and arranged to be brought into operative engagement when said members are moved to predetermined relative positions, and separate means for actuating said controlling member.

17. In a mechanism of the character described, a container, an operative device for causing the discharge of material from said container, electrically operated means to control the operation of said device, a movable member, means for actuating said member in accordance with the quantity of material discharged from said container, a second member movable with relation to the first mentioned member and cooperating therewith to control the circuit through said electrically operated means, separate means for actuating said second member, and means for disconnecting said second member from its actuating means and adjusting the same with relation to the first mentioned member.

18. In an apparatus of the character described, weighing mechanism, a container supported by said weighing mechanism, a conveyor supported by said container and arranged to deliver material therefrom, a motor supported by said container and operatively connected with said conveyor, and means for controlling the operation of said motor comprising a movable member, means separate from said weighing mechanism to actuate said movable member, said weighing mechanism having a part movable with relation to said movable member, and a circuit making and breaking device controlled by the relative movements of said movable member and said part of said weighing mechanism.

In testimony whereof, I affix my signature hereto.

JAMES M. MONTGOMERY.